United States Patent [19]
Nintz et al.

[11] 3,755,209

[45] Aug. 28, 1973

[54] FOAMABLE PARTICULATE STYRENE POLYMERS FOR THE PRODUCTION OF MOLDINGS EXHIBITING GOOD DIMENSIONAL STABILITY AND GOOD FUSION

[75] Inventors: Eckhard Nintz, Ludwigshafen; Hans-Georg Keppler, Weinheim; Ludwig Zuern, Bad Duerkheim; Erhard Stahnecker, Ziegelhausen, all of Germany

[73] Assignee: Badische Anilin & Soda-Fabrik Aktiengesellschaft, Ludwigshafen/Rhine, Germany

[22] Filed: Jan. 31, 1972

[21] Appl. No.: 222,327

[30] Foreign Application Priority Data
Feb. 3, 1971 Germany.................. P 21 04 867.9

[52] U.S. Cl...... 260/2.5 B, 260/2.5 FP, 260/45.9 R, 260/DIG. 24
[51] Int. Cl. ............................................. C08j 1/18
[58] Field of Search ................ 260/2.5 FP, DIG. 24, 260/45.9 R, 2.5 EP

[56] References Cited
UNITED STATES PATENTS
3,274,133  9/1966  Ingram ........................... 260/2.5 FP
3,654,220  4/1972  Cyba............................... 260/2.5 EP

*Primary Examiner*—Murray Tillman
*Assistant Examiner*—Morton Foelak
*Attorney*—Johnston, Root, O'Keeffe, Keil, Thompson & Shurtleff

[57] ABSTRACT

The invention relates to foamable particulate self-extinguishing styrene polymers which, on account of their low content of oxyalkylation product of ammonia or amine, are suitable for making foam articles exhibiting good fusion and good dimensional stability, and to a process for their production.

2 Claims, No Drawings

FOAMABLE PARTICULATE STYRENE POLYMERS FOR THE PRODUCTION OF MOLDINGS EXHIBITING GOOD DIMENSIONAL STABILITY AND GOOD FUSION

In one process which is commonly employed in industry moldings are made by foaming particulate foamable styrene polymers in molds. In this process, the particulate styrene polymers are first heated with steam or hot gases to temperatures above their softening point to form a loose material. This step is referred to as "pre-expansion." The pre-expanded styrene polymers are then stored for a time, after which they are further expanded in a pressure-resistant mold which is not gas-tight when closed by reheating with steam such that the particles fuse together to form a molding whose dimensions correspond to the cavity of the mold. This second step is known as "molding." After molding, the resulting article is cooled in the mold. Cooling must be continued until the interior of the molding has reached a temperature below the softening point. If the molded article is removed from the mold too soon, it may be deformed. As foamed plastics materials are good insulators, relatively long cooling periods are required to cool the moldings. The period which elapses before a molding can be removed from the mold without there being any subsequent deformation is usually referred to as the "minimum residence time in the mold."

After removal from the mold, the molding is usually stored for a time until it has completely cooled, after which it may, if it is a block for example, be cut up into foam boards for insulating purposes.

During this final cooling period, the sides of the block become concave to a certain extent. This is particularly noticeable in the case of the surfaces which have been directly exposed to the steam and the degree of shrinkage may be several percent.

In particular, shrinkage at the sides is relatively pronounced and the foamed styrene polymer particles exhibit relatively poor fusion when the styrene polymer used is one which has been prepared in the presence of halogen-containing flame retardants at temperatures above 85°C in order to shorten the polymerization time. If polymerization is carried out below the said temperature of 85°C, very long polymerization times are required but the styrene polymers obtained are capable of being processed into very good foams. For economical reasons, however, preference must be given to the process with shorter polymerization times.

It is therefore an object of the present invention to provide a process which avoids the above drawbacks of particles polymerized in the presence of halogen-containing flame retardants at temperatures above 85°C.

We have now found that particulate styrene polymers which are foamable (i.e., which contain foaming agent) and which have been prepared at polymerization temperatures above 85°C and in the presence of flame retardant organic halogen compounds can be processed into foam blocks which exhibit good fusion and whose sides do not tend to become concave, when they contain a small amount of an oxyalkylation product of ammonia or of a primary or secondary aliphatic amine, which oxyalkylation product is soluble in styrene or polystyrene. The said oxyalkylation products are also referred to as alkanolamines.

A suitable method of making such foamable styrene polymers is to polymerize styrene and, optionally, conventional comonomers in a conventional manner in aqueous suspension at temperatures above 85°C using free-radical-generating initiators and adding, before or during polymerization, an alkanolamine soluble in the organic phase of the suspension.

By oxyalkylation products of ammonia or primary or secondary amines we mean the reaction products (known as mono-, di- or trialkanolamines) of ethylene oxide, propylene oxide or higher 1,2-epoxides with ammonia or primary or secondary aliphatic amines or their polyalkylene glycol derivatives formed by further reaction with alkylene oxide.

Suitable primary or secondary aliphatic mono- or polyvalent amines for the purposes of the invention are for example those whose substituents are alkyl radicals of from 1 to 20, in particular from 6 to 20, carbon atoms, aminoalkyl radicals of from 2 to 8, in particular from 2 to 6, carbon atoms, cycloalkyl radicals having from 5 to 7 carbon atoms in the ring, or their alkyl-substituted derivatives having from 1 to 20, in particular from 1 to 10, carbon atoms in the alkyl substituent, and those (secondary) cyclic amines, in which the substituents together form an alkylene radical of from 4 to 8 carbon atoms which includes the amine nitrogen. Suitable amines are, for example, ethylamine, propylamine, stearylamine, methyldodecylamine, dibutylamine, piperidine, ethylene diamine and hexamethylene diamine.

Accordingly, very suitable alkanolamines are, for example, mono-alkanolamines such as N-decyl-ethanolamine, N-methyl-ethanolamine, N-stearyl-ethanolamine, N,N-bis-n-dodecyl-ethanolamine and N,N-bis-cyclohexylpropanol(2)-amine, an example of an alkylene oxide derivative of a cyclic aliphatic amine being N-(2-hydroxyethyl)-piperidine.

Also suitable for the manufacture of styrene polymers of the invention are dialkanolamines such as N,N-bis(2-) hydroxypropyl-n-dodecylamine and N,N-bis-hydroxyethyl-n-octadecylamine.

Finally, trialkanolamines which are suitable are those whose alkylene radical is long enough to ensure a certain degree of solubility in the organic phase of the mixture to be polymerized, for example tris-(N-2-hydroxybutyl)-amine.

In the preparation of the alkanolamines used in the invention there are also obtained, due to substitution of the hydroxyalkyl groups with further alkylene oxide, as by-products polyalkylene glycol derivatives of the amines mentioned above having for example from 2 to 3 ether-linked alkylene glycol radicals instead of a hydroxyalkyl group. These compounds are also active on their own.

It appears that neither the chemical nature of the alkyl radical, when present, nor that of the alkanol radical has a critical effect on the results achieved by the invention, provided the alkanolamine exhibits a certain degree of solubility in the monomer and the resulting polymer.

The preparation of the alkanolamines is well known and does not form part of the present invention.

The alkanolamines used in the present invention are employed in quantities of from 0.00001 to 1 percent, in particular from 0.0001 to 0.1 percent, by weight based on the styrene polymer. In all cases the amount used is extremely small compared with the amount of flame-retardant halogen compounds normally added. The substances may be added either to the organic phase or to the aqueous phase or to the reaction mixture before, during or toward the end of polymerization. The amount to be used is governed by the nature and amount of halogen compound incorporated and by the temperature regime during polymerization and may be readily determined by simple experiment.

Starting materials used for making the styrene polymers of the invention are monomer mixtures containing at least 50 percent by weight of styrene and optionally, as comonomers, for example α-methylstyrene, nuclearly halogenated styrenes, acrylonitrile, esters of acrylic or methacrylic acid with alcohols of from 1 to 8 carbon atoms, N-vinyl compounds such as N-vinyl carbazole or small amounts of butadiene or divinyl benzene.

Polymerization is advantageously carried out by the well-known pearl polymerization process at temperatures of from 85° to 130°C.

Supension stabilizers which may be used are organic protective colloids such as polyvinyl alcohol, polyvinyl pyrrolidone and mineral suspension agents such as finely-divided tricalcium phosphate and barium sulfates.

Polymerization is initiated in known manner by means of one or more free-radical-generating substances. Examples of these are t-butyl perbenzoate, t-butyl perisononanate, di-t-butyl-peroxide, dibenzoyl peroxide and mixtures thereof.

Particularly suitable flame-retardant organic halogen compounds are bromine compounds such as the brominated oligomers of butadiene or isoprene having an average degree of polymerization of from 2 to 20. Bromination may be complete or partial. Examples of typical representatives are 1,2,5,6-tetrabromocyclooctane, 1,-2,5,6,9,10-hexabromocyclododecane, brominated polybutadiene having a degree of polymerization of, say, from 3 to 15 and 1-(α, β-dibromoethyl)-3,4-dibromocyclohexane. The amount used is normally from 0.2 to 3 percent and preferably from 0.4 to 1.0 percent. It may be advantageous to add synergistic substances such as di-t-butyl peroxide, dicumyl peroxide and poly-p-di-isopropylbenzene.

The foaming agents used in the process of the invention are liquid or gaseous organic compounds which are non-solvents for the styrene polymer and boil at temperatures below the softening point of the polymer, for example aliphatic hydrocarbons such as propane, butane, pentane, hexane, cyclohexane or halogenated hydrocarbons such as methyl chloride, dichlorofluoromethane, 1,2,2-trifluoroethane and 1,1,2-trichloroethane. Mixtures of foaming agents may also be used. The amount of foaming agent used is normally from 2 to 20 percent and preferably from 3 to 12 percent by weight of the monomers.

The expandable styrene polymers may also contain additives such as dyes, fillers, stabilizers and other flame retardants. They are produced in particulate form, for example in the form of beads, and generally have a diameter of from 0.1 to 6 mm, preferably from 0.4 to 3 mm. They are pre-expanded by known methods and completely expanded by heating in molds which are not gastight when closed so that the particles fuse together to form a foam article whose dimensions correspond to the internal dimensions of the mold used. Moldings obtained by foaming the styrene polymers of the invention are dimensionally stable, i.e., the sides show only a slight tendency to become concave after the molding has been removed from the mold.

Another advantage of the styrene polymers of the invention is that the foam articles made therefrom exhibit particularly good fusion. The moldings therefore have particularly good mechanical strenth properties. The small amount of alkanolamine present in the finished foam has a certain antistatic effect, but it is a rule not sufficient to achieve the optimum antistatic effect.

EXAMPLE 1

Experiment (a)

The following mixture is charged into a 1,000 l stirred autoclave purged with nitrogen:
- 450 l of water having a hardness of 15° (German hardness)
- 230 g of sodium pyrophosphate
- 230 g of sodium acetate
- 560 g of magnesium sulfate
- 420 kg of styrene
- 4.5 kg of acrylonitrile
- 1.3 kg of t-butyl perbenzoate
- 150 g of t-butyl peroctoate
- 760 g of dicumyl peroxide
- 1.9 kg of 1,2,5,6,9,10-hexabromocyclododecane
- 6g of bis-hydroxyethyl-dodecylamine (equivalent to 0.0015 percent based on styrene).

The mixture is polymerized in the closed autoclave, with stirring, for 2 hours at 85°C and then for 12 hours at 115°C. While the mixture is being heated from 85° to 115°C there is added 15 kg of a 10 percent solution of polyvinyl pyrrolidone having a K value of 85. 3 hours after a temperature of 115°C has been reached, there is added 26 kg of n-pentane in the course of 15 minutes.

Experiment (b)

This is a repetition of Experiment (a) carried out under the same conditions except that 10 g of bis-hydroxyethyl-dodecylamine is used instead of 6 g thereof.

Comparative experiment

This is a repetition of Experiment (a) except that polymerization is carried out without the inclusion of hydroxyethyl-dodecylamine.

Manufacture of foam blocks

Aliquots of the three polymers produced in Experiments (a) and (b) and the comparative experiment are pre-expanded in flowing steam until they have a bulk density of 18 g/l. The pre-expanded samples are stored for 24 hours in the presence of air at room temperature, They are then completely expanded with wet steam in pressure-resistant molds measuring 100 × 50 × 100 cm which are not gastight when closed to form foam blocks. The results are summarized in the following Table.

| Example 1 | Steam Pressure in Mold (atm. gauge) | Steaming Period * (sec) | Quality of fusion ** (%) | Degree of shrinkage at large sides*** (%) |
|---|---|---|---|---|
| (a) | 0.8 | 20 | 90 | 0.8 |
|  | 0.6 | 20 | 90 | 0.3 |
|  | 0.5 | 20 | 80 | 0.4 |
|  | 0.5 | 50 | 90 | 0.4 |
| (b) | 0.8 | 20 | 90 | 0.2 |
|  | 0.6 | 20 | 90 | 0.3 |
|  | 0.5 | 20 | 80 | 0.3 |
|  | 0.5 | 50 | 90 | 0.3 |
| Comparative experiment | 0.8 | 20 | 35 | 4 |
|  | 0.6 | 20 | 40 | 2.0 |
|  | 0.5 | 20 | 40 | 1.8 |
|  | 0.5 | 50 | 55 | 1.8 |

*The steaming period is the time measured from the moment at which the stated steam pressure is reached in the mold to the moment at which the steam inlet valve is closed.
**The quality of fusion is taken to be the ratio of the number of torn beads to the total number of beads at the fracture produced by forcibly breaking the block.
***Shrinkage of the blocks is measured 24 hours after removal of the block from the mold. It is determined by measuring the thickness of the block at the middle of a large side. The difference between the width of the mold at this point and the thickness of the block at this point, expressed as a percentage of the width of the mold, is the "degree of shrinkage".

EXAMPLE 2

Experiment (a)

The following mixture is used:
450 l of water of a hardness of 15° (German hardness)
230 g of sodium pyrophosphate
230 g of sodium acetate
560 g of magnesium sulfate
420 kg of styrene
1.3 kg of t-butyl perbenzoate
300 g of t-butyl peroctoate
760 g of dicumyl peroxide
2.7 kg of 1,2,5,6,9,10-hexabromocyclododecane
21 g of N-hydroxyethylpiperidine (equivalent to 0.005% based on styrene).

The mixture is polymerized with stirring in a closed 1,000 l autoclave for 2 hours at 90°C, 1 hour at 100°C, 1 hour at 110°C and 6 hours at 115°C.

One hour after a temperature of 90°C has been reached, 15 kg of a 10 percent solution of polyvinyl pyrrolidone (K value 87) is added to the mixture. 2.5 hours after a temperature of 115°C has been reached, 28 kg of n-pentane are metered into the mixture in the course of 15 minutes.

The resulting beads may be used for making moldings exhibiting good fusion and good dimensional stability. This is shown in the following table, which also lists the results of the following experiments.

Experiment (b)

This is a repetition of Experiment (a) except that 7 g of N-hydroxyethylpiperidine is used instead of 21 g thereof. The foamable polystyrene beads obtained exhibit good processing characteristics.

Experiment (c)

This is a repetition of Experiment (a) except that the compound mentioned in Experiments (a) and (b) is replaced by 42 g (equivalent to 0.01 percent) of N-hydroxyethyl-dicyclohexylamine. This experiment also produces dimensionally stable moldings exhibiting good fusion.

Experiment (d)

The sample is polymerized using 21 g (equivalent of 0.005 percent) of N-hydroxyethyl-dicyclohexylamine. The pre-expanded beads also produce dimensionally stable moldings.

Experiment (e)

In a repetition of Experiment (a) the additive used in that experiment is replaced by 21 g (equivalent to 0.005 percent) of N,N-bis-hydroxyethylcyclohexylamine. After polymerization, it is possible to process the resulting beads into foam products exhibiting very good dimensional stability and fusion.

Experiment (f)

Experiment (e) is repeated except that only 5 g (equivalent to 0.0013 percent) of amine is used. The moldings made from this product exhibit fairly good dimensional stability and fusion.

Experiment (g)

The above procedure is followed except that 21 g (equivalent to 0.005 percent) of dimethylethanolamine is used as additive. Dimensionally stable moldings are produced.

Experiment (h)

The above procedure is followed except that 21 g (equivalent to 0.005 percent) of N,N,N-trihydroxybutylamine is used as additve. A product exhibiting good processing characteristics is obtained in this case, too.

Experiment (i)

The above procedure is followed except that 21 g (equivalent to 0.005 percent ) of N,N,N', N'-tetrahydroxypropylhexamethylene diamine is used as additive. The product can be processed into dimensionally stable moldings exhibiting good fusion.

Comparative Experiment

In an experiment carried out under the same conditions but without the additive proposed by the invention there are produced beads which can only be processed into moldings exhibiting poor fusion and a relatively high degree of shrinkage at the sides.

Manufacture of foam blocks

The expandable polymers produced in the above experiments of Example 2 were processed into moldings in the following manner:

An aliquot was foamed in flowing steam until it had a bulk density of 18 g/l and was then left in the presence of air for 24 hours. The pre-expanded sample was then completely foamed with steam in a pressure-resistant mold measuring 100 × 50 × 100 cm which is not gastight when closed to form a foam block. The most important properties of the moldings are given in the following Table.

| Example 2 | Steam Pressure in Mold (atm. gauge) | Steaming Period* (sec) | Quality of fusion** (%) | Degree of shrinkage at large sides*** (%) |
|---|---|---|---|---|
| (a) | 0.8 | 20 | 70 | 0.8 |
|     | 0.5 | 50 | 80 | 0.7 |
| (b) | 0.8 | 20 | 50 | 1.2 |
|     | 0.5 | 50 | 60 | 0.9 |
| (c) | 0.8 | 20 | 90 | 0.4 |
|     | 0.5 | 50 | 90 | 0.2 |
| (d) | 0.8 | 20 | 80 | 0.5 |
|     | 0.5 | 50 | 90 | 0.2 |
| (e) | 0.8 | 20 | 70 | 0.8 |
|     | 0.5 | 50 | 80 | 0.5 |
| (f) | 0.8 | 20 | 60 | 1.3 |
|     | 0.5 | 50 | 80 | 0.7 |
| (g) | 0.8 | 20 | 55 | 1.5 |
|     | 0.5 | 50 | 60 | 1.0 |
| (h) | 0.8 | 20 | 80 | 0.4 |
|     | 0.5 | 50 | 90 | 0.2 |
| (i) | 0.8 | 20 | 65 | 1.0 |
|     | 0.5 | 50 | 90 | 0.5 |
| Comparative experiment | 0.8 | 20 | 25 | 4.5 |
|     | 0.5 | 50 | 30 | 3.7 |

*The steaming period is the time measured from the moment at which the stated steam pressure is reached in the mold to the moment at which the steam inlet valve is closed.
**The quality of fusion is taken to be the ratio of the number of torn beads to the total number of beads at the fracture produced by forcibly breaking the block.
***Shrinkage of the blocks is measured 24 hours after removal of the block from the mold. It is determined by measuring the thickness of the block at the middle of a large side. The difference between the width of the mold at this point and the thickness of the block at this point, expressed as a percentage of the width of the mold, is the "degree of shrinkage".

We claim:

1. Expandable self-extinguishing styrene polymers containing from 0.2 to 3 percent by weight of a conventional flame-retardant organic bromine compound and from 0.00001 to 1 percent by weight, based on the styrene polymer, of an oxyalkylation product of ammonia or of a primary of secondary aliphatic amine with ethylene oxide, propylene oxide or higher 1, 2 epoxides, which oxyalkyl-ation product is soluble in styrene or polystyrene and contains from 1 to 3 oxyalkylene groups.

2. A process for the manufacture or bromine compound-containing expandable styrene polymers as claimed in claim 1 by polymerizing styrene and, optionally, conventional comonomers in aqueous suspension at temperatures above 85°C using free-radical-generating initiators, wherein from 0.00001 to 1 percent by weight, based on the styrene polymer, of an oxyalkylation product of ammonia or a primary or secondary aliphatic amine with ethylene oxide, propylene oxide or higher 1, 2 epoxides and contains from 1 to 3 oxyalkylene groups, which oxyalkylation product is soluble in the organic phase of the suspension, is added to the suspension before or during polymerization.

* * * * *

UNITED STATES PATENT OFFICE
CERTIFICATE OF CORRECTION

Patent No. 3,755,209　　　　　　Dated August 28, 1973

Inventor(s) Eckhard Nintz et al

It is certified that error appears in the above-identified patent and that said Letters Patent are hereby corrected as shown below:

Column 3, line 19, "Supension" should read -- Suspension --.

Column 4, line 6, insert -- as -- after "is".

Column 4, line 10, insert -- ; -- after "(a)".

Column 4, line 34, insert -- ; -- after "(b)".

Column 4, line 39, insert -- ; -- after "experiment".

Column 4, line 43, insert --; -- after "blocks".

Column 4, line 49, "," should read -- . --.

Column 5, line 11, insert -- ; -- after "(a)".

Column 5, line 39, insert -- ; -- after "(b)".

Column 5, line 44, insert -- ; -- after "(c)".

Column 5, line 51, insert -- ; -- after "(d)".

Column 5, line 56, insert -- ; -- after "(e)".

Column 5, line 63, insert -- ; -- after "(f)".

Column 5, line 68, insert -- ; -- after "(g)".

Column 6, line 5, insert -- ; -- after "(h)".

Column 6, line 8, "additve" should read -- additive --.

UNITED STATES PATENT OFFICE
CERTIFICATE OF CORRECTION

Patent No. 3,755,209　　　　Dated August 28, 1973

Inventor(s) Eckhard Nintz et al

It is certified that error appears in the above-identified patent and that said Letters Patent are hereby corrected as shown below:

Column 6, line 11, insert -- ; -- after "(1)".

Column 6, line 17, insert -- ; -- after "Experiment".

Column 6, line 23, insert -- ; -- after "blocks".

Column 7, line 3, "of", 2nd occ. should read -- or -- .

Column 7, line 5, "oxyalkyl-ation" should read -- oxyalkylation --.

Column 7, line 8, "or" should read -- of --.

Signed and sealed this 1st day of October 1974.

(SEAL)
Attest:

McCOY M. GIBSON JR.
Attesting Officer

C. MARSHALL DANN
Commissioner of Patents